March 19, 1963  L. E. REED ET AL  3,081,627
TANK TRUCK DELIVERY SYSTEM AIR ELIMINATION
Filed Nov. 10, 1959

LIONEL E. REED
ROBERT J. WHITLEY
INVENTORS

BY *[signature]*
Attorney

United States Patent Office 3,081,627
Patented Mar. 19, 1963

3,081,627
TANK TRUCK DELIVERY SYSTEM
AIR ELIMINATION
Lionel E. Reed, Greenwich, Conn., and Robert J. Whitley, Nutley, N.J., assignors to Socony Mobil Oil Company, Inc., a corporation of New York
Filed Nov. 10, 1959, Ser. No. 852,127
4 Claims. (Cl. 73—200)

This invention relates to devices for eliminating air from liquid metering systems used in dispensing liquid from tank vehicles, such systems being commonly employed for filling underground storage tanks with liquids such as gasoline or fuel oil.

Systems of this nature ordinarily rely on gravity flow and a syphon action which is created by the negative pressure exerted by a gravity unloading hose. In case a pump is used in the discharge line as, for example in transferring liquid to a storage tank elevated above the tank truck, the negative pressure upon the discharge side of the metering system will arise from the pump suction. This negative pressure increases as the tank is being emptied, and unless broken, resulting syphon action will partially or totally empty the meter thus admitting air or gas into the metering system, thereby causing inaccuracy in liquid measurement. The practice heretofore in breaking said syphon action has been to utilize a combination air eliminator and meter. This conventional air eliminator is installed at the terminus of piping leading from one or more tank compartments, each equipped with an emergency valve at its outlet. Alternatively, a common pipeline is installed inter-connecting multiple compartments with the metering equipment, or a separate pipeline is connected from each compartment to a common manifold equipped with valves to provide selective liquid flow from any one compartment to the meter.

In conventional air eliminators, the air eliminator chamber is located ahead of the meter, in between the meter and the tank vehicle. When liquid flows from the tank vehicle into a dispensing system containing air, the air is collected in a sump which is an integral part of the air eliminator chamber, and partially or totally displaces the liquid contained therein. The sump is equipped with a float device, which float will drop as liquid is displaced by air, thus opening an air release valve at the top of the air eliminator chamber, and the air will be forced upward by the system pressure and escape through the air release valve and is conveyed therethrough to a gravity unloading hose on the downstream side of the meter, and into a receiving tank. When a pump is used, air will be conducted through an air release pipe into the top of said tank vehicle. This diversion of air into the unloading hose (or tank vehicle when a pump is used) breaks the syphon action previously described and prevents suction of air through the metering system, which otherwise would cause erroneous meter registration.

It should be noted, however, that the "syphon break" described hereinabove utilizes air from tank vehicle through the dispensing system in order to relieve the negative pressure exerted by the gravity unloading hose or suction pump.

The conventional air eliminator, however, offers several disadvantages. It will not function when installed on the suction side of a pump due to the fact that the air eliminator chamber, which is located ahead of the meter, will eliminate air only when it is under positive pressure. When installed on the suction side of a pump, the negative pressure created by the pump will draw air through the meter, thereby causing erroneous meter registrations; or, if the air eliminator is equipped with a check valve which closes automatically when air enters the chamber and causes the float to drop, the flow of product will cease or decrease to a degree that the functioning of the system is unsatisfactory. Furthermore, any rush of air through the meter may cause damage thereto. Another disadvantage of the conventional air eliminator is that it is always installed as a part of the piping system, thus causing a large line pressure drop resulting in a corresponding decrease in flow rate. The highest capacity air eliminator available for tank vehicle installation is rated at a maximum flow rate of 300 gallons per minute and weighs approximately 40 lbs. in addition to the weight of the volume of liquid retained therein. An air eliminator of this capacity is bulky, has large dimensions and, is, therefore, difficult to install on a tank vehicle. This problem is increased for those vehicles which are equipped with dual dispensing systems with meters for the purpose of fast unloading or for separation of dissimilar liquids.

It is a major object of this invention to overcome the aforementioned objections and disadvantages in air eliminator set-ups.

It is an object of this invention to provide an air eliminator which is not installed as a part of the main piping system by which dispensed liquid is led from the tank to storage.

It is an object of this invention to provide an air eliminator of small size and weight, conveniently connected to the main piping system by pipes of small diameter and relatively short length.

It is also an object of this invention to provide an air eliminator of such nature that dispensed liquid need not pass through the air eliminator.

It is an object of this invention to provide an air eliminator which will prevent introduction of air into the meter by breaking the siphon action of the discharge system with air introduced to that system at a point beyond the meter, without drawing the air from the tank or through the piping system.

These and other objects are accomplished by the air eliminator constructed as herein disclosed, as will be apparent upon examination of this invention.

The novel air eliminator of this invention is shown in diagram form in the several drawings attached to and made a part of this disclosure.

Figure 1:
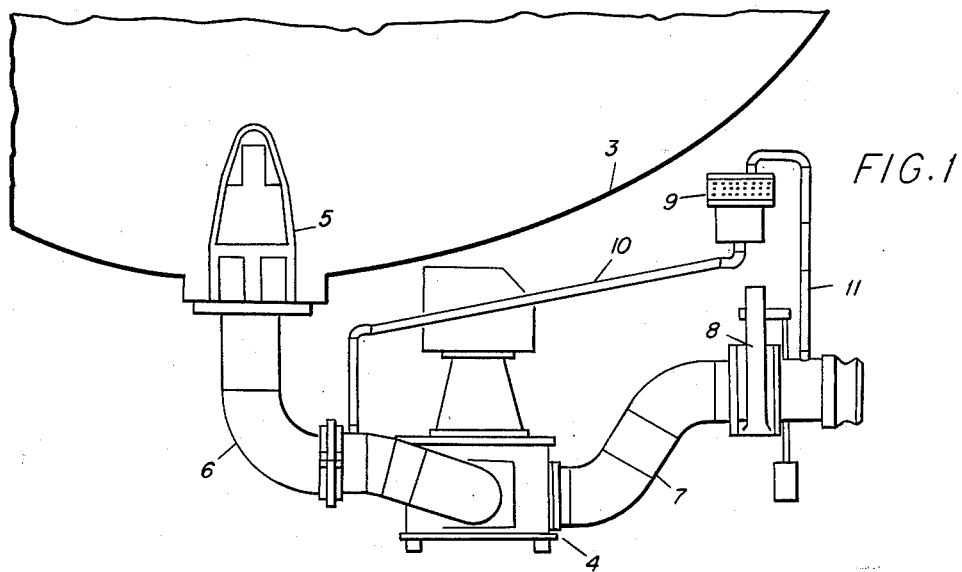
FIGURE 1 is a diagrammatic view of the liquid metering system of this invention.

In FIGURE 1 of the attached drawing briefly described above, the numeral 3 denotes a tank from which liquid is to be dispensed through a meter 4. In the bottom of tank 3, there is shown a conventional emergency valve 5, normally closed, which is operated by conventional mechanical, hydraulic, or air operated system when dispensing liquid from tank 3.

Extending from the bottom of tank 3, there is shown a discharge pipe 6 through which liquid is dispensed from tank 3 into meter 4, and out of meter 4 into an outlet pipe 7 and through an unloading valve 8.

Also shown in this drawing is an air eliminator 9 which is suitably connected to the upstream side of meter 4 through a connecting pipe 10, and to the downstream side of meter 4, before or after unloading valve 8, through a connecting pipe 11.

Pipe 7 and unloading valve 8 are so mounted as to maintain meter 4 full of liquid at all times, provided air is not drawn into meter 4 through pipe 6 because of vortex formation and air entrainment when the liquid level in tank 3 is low.

Figure 2:
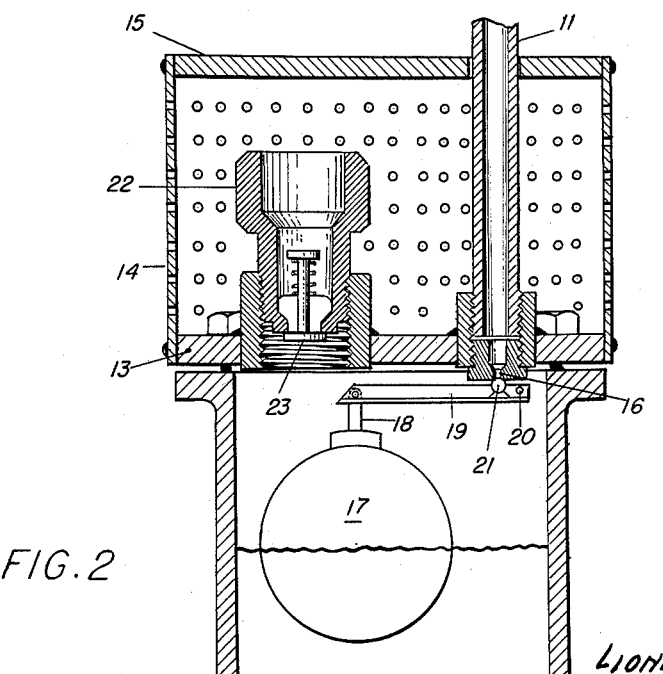
FIGURE 2 is an enlarged diagrammatic view of a vertical section of the air eliminator of this invention described hereinafter in more detail.

A more detailed diagrammatic view of a vertical section of the air eliminator chamber 9 is shown in FIGURE 2.

In this figure, the air eliminator 9 is shown to consist of a bottom chamber 12, provided with a cap plate 13, and an atmospheric chamber defined by a cylindrical perforated shield or screen 14, which rests on cap plate 13, and which, in turn, is provided with a cover plate 15.

Liquid is supplied to chamber 12 through pipe 10 which originates from pipe 6 at a point just ahead of meter 4.

The air eliminator chamber 9 is so mounted that when a liquid level is maintained therein which is approximately ½ of the vertical elevation of the bottom chamber 12, this level is approximately the liquid level in tank 3 (see FIGURE 1), such that a vortex would form due to low level of liquid in tank 3, as tank 3 approaches emptiness. Also shown in the drawing is a pipe 11 which communicates with discharge pipe 7, immediately beyond unloading valve 8, and which pipe 11 is extended vertically downward through the atmospheric chamber defined by screen 14, into cap plate 13, and terminates into an orifice or a valve opening 16. A float 17 is shown in chamber 12, which float is connected by a suitable connection 18 to an arm 19, which arm is pivoted about a point 20. Arm 19 carries a valve closing ball or plug 21 situated in register with orifice 16 at the bottom of pipe 11. Orifice closing ball or plug 21 and float 17 are so mounted that a rising liquid level in chamber 12 will elevate float 17, thus closing orifice 16 with valve plug 21. Cap plate 13 also carries a valve structure comprising a valve housing 22 containing valve 23 which is spring-biased upwardly to close chamber 12 against atmospheric pressure existing within the perforated or cylindrical shield or screen 14.

While the specific form of device shown here is a float chamber with a valve mechanism controlled by a ball-type float, it will be appreciated by those skilled in the art that this float chamber and float amount basically to a level-sensing or liquid head static pressure sensing device arranged to open a valve when that liquid head pressure falls below a pre-determined amount. Consequently, a variety of devices, such as pressure operated pistons, pressure operated diaphragms, or electrically operated liquid level-sensing systems may be utilized as means to operate valve parts 21 and 16.

The spring-biasing of valve 23 is so adjusted that when float 17 is lowered, valve plug 21 which is situated at the bottom of pipe 11 is opened, thus establishing communications between chamber 12 and pipe 7 beyond the unloading valve 8. The pressure beyond valve 8 which is less than atmospheric (due to negative pressure exerted by a gravity hose or a suction pump) will be communicated through pipe 11 to chamber 12, which pressure, being less than atmospheric, will cause valve 21 to open, thus admitting air to chamber 12, through pipe 11 and thence to pipe 7; therefore, the pressure in pipe 7, immediately adjacent unloading valve 8, becomes nearly atmospheric, and since tank 3 is open to the atmosphere, the differential pressure head across meter 4 will be reduced to that of the fluid head existing between unloading valve 8 and the level of liquid in tank 3. Since this differential pressure head is insufficient to support a vortex, no vortex-entrained air will pass through meter 4.

The system of my present invention operates in the following manner.

Liquid is dispensed from tank 3 by opening the emergency valve 5 and unloading valve 8. The static head of liquid in tank 3 is imposed on discharge pipe 6, causing liquid to flow therethrough into meter 4, and out through outlet pipe 7, unloading valve 8 and through a gravity unloading hose suitably connected to unloading valve 8, into a receiving tank. Meter 4 and unloading valve 8 are so positioned that connected piping can not be drained when unloading, thus normally excluding introduction of air through meter 4 when tank 3 is emptied. As liquid is being dispensed from tank 3 liquid will be admitted to the air eliminator chamber 12 through pipe 10 which is connected to discharge pipe 6, just ahead of meter 4, thus elevating float 17, which float in turn will close valve 21 in bottom of pipe 11, and remain closed as liquid is being dispensed from tank 3. When the liquid level in tank 3 approaches a low level, about six inches or less above the bottom of said tank, a vortex generally starts to form in the liquid flowing to the emergency valve 5. Due to the air which penetrates downward from the vortex, or due to the pressure drop through the emergency valve outlet (or both of these reasons), the static pressure in discharge pipe 6 will drop to nearly zero, causing liquid to be drawn downward from the air eliminator chamber 12. As the liquid level in chamber 12 is lowered, float 17 is also lowered, thus opening valve 21 in bottom of pipe 11, and establishing communication between chamber 12 and outlet pipe 7, adjacent unloading valve 8 which is at a pressure below atmospheric (due to negative pressure exerted by gravity unloading hose or suction pump). This negative pressure in pipe 7 will be communicated through pipe 11 into chamber 12, thus opening the spring-biased valve 23 and admitting air therethrough into chamber 12, and out of chamber 12 through pipe 11 to pipe 7, thus transferring the negative pressure in the unloading hose from the liquid leaving the unloading hose to the air column, and since tank 3 and the unloading hose are now both open to the atmosphere, the only differential pressure head across meter 4 will be reduced to that of the fluid head existing between unloading valve 8 and the liquid level in tank 3. This differential pressure being insufficient to support a vortex-created flow causes the vortex to collapse and, accordingly, the remaining liquid will be discharged at a slower flow rate until tank 3 has been emptied, without introduction of air into the metering system.

It is essential to the operation described hereinabove that the flotation level of the air eliminator float 17 must not be above the elevation at which vortex will start to form in tank 3 when tank 3 is being emptied. This will cause a premature action of the air eliminator and undue loss in unloading flow rate.

It will be observed that the air eliminator device of the present invention is not installed in or as a part of the main piping system leading from the vehicle tank to the meter, but is connected to the upstream and downstream sides of said meter by means of short connecting pipelines of relatively small size. This greatly reduces weight of the required air eliminator equipment, resulting in a substantial reduction in size of the said equipment, simplifying its installation, and thus lowering its overall cost.

The liquid being dispensed from a tank vehicle need not pass through the air eliminator chamber (unlike the conventional air eliminators in which the dispensed liquid must usually flow through the air eliminator chamber), thus eliminating a high line pressure drop and resulting in a substantial increase in flow rate.

The air eliminator of the invention introduces air from the atmosphere to the outlet side of the meter to break the previously described syphon action, as the tank vehicle is being emptied, thus permitting unloading without introduction of air from said tank vehicle into the piping system as in conventional installations.

When pumps are used, as in the case of transport deliveries, the air eliminator of this invention automatically supplies air with which to "blow" the pump and its connections free of liquid, therefore assuring complete liquid delivery, and avoiding subsequent contamination with different type of liquid therein.

If a strainer is normally used in the conventional air eliminator, then, when using the air eliminator of this invention, said strainer, which is normally a part of a standard emergency valve, must be of such mesh as to prevent passage of solid materials, in order to protect the meter adequately.

It will be observed that this air eliminator or vacuum breaking device is dependent upon the application of the following principles:

The maintenance upon the float, in the float chamber of a pressure created by the static liquid head existing in the delivery piping between the tank and the meter;

The positioning of the level of the float as nearly as possible to that level in the tank at which a vortex in the delivered liquid would be created at high rates of delivery flow;

The provision of means whereby the negative pressure existing in the portion of the delivery piping downstream from the meter can be communicated to the float chamber as soon as the static head or liquid level in the tank, which is the same thing, is such that a vortex would form in liquid flowing out of the tank at a high rate;

And the immediate usage of that negative pressure in the float chamber to admit atmospheric pressure air to the portion of the delivery piping downstream from the meter.

In this, knowledge of the depth of liquid above the bottom of the tank at which vortex formation will occur at expected high rates of delivery is necessary in order to properly locate the level of the float chamber. For any given arrangement of delivery piping, whether for delivery from a single tank, or for simultaneous delivery from multiple compartments of a large tank truck, this can be determined readily by experiment and a proper location of the float chamber specified for all installations of a specific type. With somewhat less assurance it can be specified as a certain number of inches, say six inches, above the tank bottom, for a particular set-up. In any event, a very small amount of experience can result in substantial certainty of location of the float chamber.

We claim:

1. A high flow rate liquid delivery system for delivering metered liquid from a tank truck, comprising a liquid meter, piping from the bottom of said tank truck to said meter, delivery piping on the downstream side of said meter, and a vacuum breaker system to prevent access of air with liquid to said meter, which system comprises a closed chamber with a liquid level-sensing means therein, a conduit supplying liquid to said closed chamber from a point adjacent to but upstream from said meter, a second conduit connecting the upper portion of said closed chamber with liquid delivery piping downstream from said meter, a valve actuated by said liquid level-sensing means to close the chamber end of said second conduit, said closed chamber being so located with respect to the bottom of the truck tank that the liquid level existing in said chamber when the liquid-level sensing means opens the chamber end of the second conduit is above the bottom of the truck tank and substantially at the liquid level existing within the truck tank when vortex formation is imminent in the out-flowing liquid in the tank truck, and a valve acting to admit air to the upper portion of said closed chamber when the pressure therein falls below atmospheric pressure.

2. A high flow rate liquid delivery system for delivering metered liquid from a tank truck, comprising a liquid meter, piping from the bottom of said tank truck to said meter, delivery piping on the downstream side of said meter, and a vacuum breaker system to prevent access of air with liquid to said meter, which system comprises a closed float chamber with a float therein, a conduit supplying liquid to said float chamber from a point adjacent to but upstream from said meter, a second conduit connecting the upper portion of said float chamber with liquid delivery piping downstream from said meter, a valve actuated by said float to close the float chamber end of said second conduit, said float and float chamber being so located with respect to the bottom of the tank truck that the float will fall and open the float chamber end of said second conduit when the level of liquid in the tank truck is such that vortex formation is imminent in the out-flowing liquid in the tank truck, and a valve acting to admit air to the upper portion of said closed float chamber when the pressure therein falls below atmospheric pressure.

3. A vacuum breaking air eliminator for the prevention of entry of air to a fluid meter in the delivery system of a tank truck for transporting and delivering liquid petroleum products comprising a closed float chamber and a float therein, means establishing liquid communication between said float chamber and the liquid delivery piping at a point in said piping located adjacent the inlet side of the meter, pressure communicating means establishing communication between the float chamber and the delivery piping at a point downstream from the meter, valve means operable by said float to close said pressure communicating means at its entrance to the float chamber, valve means communicating with said float chamber to permit entry of air thereinto when the pressure in said float chamber is less than atmospheric, said float chamber being so located that the float therein will act to open the pressure communicating means when the level in the tank from which liquid is being delivered falls to a level at which a vortex may start to form in the outflowing liquid.

4. A vacuum breaking air eliminator for the prevention of entry of air to a fluid meter in the delivery system of a tank truck for transporting and delivering liquid petroleum products comprising a closed liquid level chamber and a liquid level sensing means therein, means establishing liquid communication between said liquid level chamber and the liquid delivery piping at a point in said piping located adjacent the inlet side of the meter, pressure communicating means establishing communication between the liquid level chamber and the delivery piping at a point downstream from the meter, valve means operable by said liquid level sensing means to close said pressure communicating means at its entrance to the liquid level chamber, valve means communicating with said liquid level chamber to permit entry of air thereinto when the pressure in said liquid level chamber is less than atmospheric, said liquid level chamber being so located that the liquid level sensing means therein will act to open the pressure communicating means when the level in the tank from which liquid is being delivered falls to a level at which a vortex may start to form in the outflowing liquid.

References Cited in the file of this patent

UNITED STATES PATENTS

| 1,707,657 | Douglas | Apr. 2, 1929 |
| 2,093,952 | Brubaker | Sept. 21, 1937 |
| 2,103,020 | Saarinen | Dec. 21, 1937 |

FOREIGN PATENTS

| 945,723 | Germany | July 12, 1956 |